US012579922B2

(12) United States Patent
Eom

(10) Patent No.: US 12,579,922 B2
(45) Date of Patent: Mar. 17, 2026

(54) ELECTRONIC DEVICE AND AN OPERATING METHOD THEREOF

(71) Applicant: SAMSUNG ELECTRONICS CO., LTD., Suwon-si (KR)

(72) Inventor: Kiwoong Eom, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 193 days.

(21) Appl. No.: 18/379,225

(22) Filed: Oct. 12, 2023

(65) Prior Publication Data

US 2024/0153426 A1 May 9, 2024

(30) Foreign Application Priority Data

Nov. 3, 2022 (KR) ........................ 10-2022-0145561

(51) Int. Cl.
*G09G 3/20* (2006.01)
*G09G 5/02* (2006.01)
(Continued)

(52) U.S. Cl.
CPC ... *G09G 3/2003* (2013.01); *G09G 2320/0242* (2013.01); *G09G 2320/0285* (2013.01)

(58) Field of Classification Search
CPC ............ G09G 3/203; G09G 5/02; G09G 5/06; G09G 5/10; G09G 5/028; G09G 2320/66; G09G 2320/066; G09G 2320/0242; G09G 2320/0285; G09G 2320/0271; G09G 2320/0276; H04N 1/60; H04N 1/6019; H04N 1/6025; H04N 1/6027; H04N 5/445; H04N 5/57–58; H04N 9/64–78;
(Continued)

(56) References Cited

U.S. PATENT DOCUMENTS 9,743,100 B2 8/2017 Sato
10,332,481 B2 6/2019 Atkins et al.
(Continued)

FOREIGN PATENT DOCUMENTS

KR 10-2008-0016016 2/2008
KR 10-2018-0029160 3/2018

OTHER PUBLICATIONS

Hak-Sung Lee, et al., “A real time color gamut mapping using tetrahedral interpolation for digital tv color reproduction enhancement”, IEEE Transactions on Consumer Electronics, vol. 55, No. 2, May 2009, pp. 599-605.

*Primary Examiner* — Wesner Sajous
(74) *Attorney, Agent, or Firm* — Morgan, Lewis & Bockius LLP

(57) ABSTRACT

An electronic device including: a first color gamut compensator configured to load a first look-up table storing first conversion data, wherein the first conversion data is used to convert a color gamut of video data including pixel values; and a second color gamut compensator configured to load a second look-up table storing second conversion data, wherein the second conversion data is used to convert the color gamut of the video data when the second color gamut compensator is in an idle state, wherein any one of the first color gamut compensator and the second color gamut compensator is further configured to convert a color gamut of each of the pixel values, by using the first look-up table or the second look-up table.

19 Claims, 13 Drawing Sheets

(51) Int. Cl.

| | |
|---|---|
| ***G09G 5/06*** | (2006.01) |
| ***H04N 1/60*** | (2006.01) |
| ***H04N 5/57*** | (2006.01) |
| ***H04N 9/64*** | (2023.01) |

(58) Field of Classification Search

CPC ............... G06T 11/001; G06T 2207/00; G06T 2207/10024; G06T 2019/2012; G06V 10/80; G06V 20/10; G06V 30/10

See application file for complete search history.

(56) References Cited

U.S. PATENT DOCUMENTS

| | | | | |
|---|---|---|---|---|
| 11,100,889 | B2 | 8/2021 | Lee et al. | |
| 11,223,745 | B2 | 1/2022 | Yim et al. | |
| 11,262,584 | B2 | 3/2022 | Ouderkirk et al. | |
| 2011/0141499 | A1* | 6/2011 | Ono ..................... | H04N 1/6072 358/1.9 |
| 2017/0070735 | A1* | 3/2017 | Ramasubramonian ...................... | H04N 19/124 |
| 2021/0314570 | A1* | 10/2021 | Baylon ................ | H04N 19/177 |

* cited by examiner

ELECTRONIC DEVICE AND AN OPERATING METHOD THEREOF

CROSS-REFERENCE TO RELATED APPLICATION

This application claims priority under 35 U.S.C. § 119 to Korean Patent Application No. 10-2022-0145561, filed on Nov. 3, 2022, in the Korean Intellectual Property Office, the disclosure of which is incorporated by reference herein in its entirety.

TECHNICAL FIELD

The inventive concept relates to an electronic device, and more particularly, to an electronic device for converting the color gamut of video data and an operating method of the electronic device.

DISCUSSION OF RELATED ART

Recently, a wide range of high quality displays have been developed. However, different types of displays exhibit varying display characteristics. Thus, when the same video data is input to these displays, each one may display a different color. In addition, even displays of the same type may display different colors when provided with the same video data. These differences arise due to variances in their physical, electrical, or mechanical characteristics resulting from the manufacturing process.

A method is needed to enable fine color representation on different types of displays and to enhance a user's viewing experience in viewing a screen through these displays.

SUMMARY

The inventive concept provides an electronic device for converting the color gamut of video data by using any one of a color gamut compensator in an idle state and a color gamut compensator in a non-idle state and an operating method of the electronic device.

According to an embodiment of the inventive concept, there is provided an electronic device including: a first color gamut compensator configured to load a first look-up table storing first conversion data, wherein the first conversion data is used to convert a color gamut of video data including pixel values; and a second color gamut compensator configured to load a second look-up table storing second conversion data, wherein the second conversion data is used to convert the color gamut of the video data when the second color gamut compensator is in an idle state, wherein any one of the first color gamut compensator and the second color gamut compensator is further configured to convert a color gamut of each of the pixel values, by using the first look-up table or the second look-up table.

According to an embodiment of the inventive concept, there is provided an electronic device including: a plurality of image processors configured to perform image processing on video data including pixel values; a plurality of color gamut compensators corresponding to the plurality of image processors, respectively, and configured to convert a color gamut of each of the pixel values included in the video data that has been image-processed; and a controller configured to select, based on information of the video data, one or more auxiliary color gamut compensators in an idle state from among the plurality of color gamut compensators, wherein a main color gamut compensator that is not in the idle state from among the plurality of color gamut compensators and at least one of the one or more auxiliary color gamut compensators are configured to convert a color gamut of each of compensated pixel values, wherein the compensated pixel values are pixel values included in the video data that were image-processed by an image processor corresponding to the main color gamut compensator.

According to an embodiment of the inventive concept, there is provided an operating method of an electronic device including a plurality of color gamut compensators for converting a color gamut of each of pixel values, the operating method including: receiving video data including the pixel values; determining one or more color gamut compensators in an idle state from among the plurality of color gamut compensators, based on information of the video data; and converting the color gamut of each of the pixel values, by using one of a main color gamut compensator which is not in the idle state or one of one or more auxiliary color gamut compensators from among the plurality of color gamut compensators.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

Hereinafter, an embodiment of the inventive concept will be described in detail with reference to the accompanying drawings.

Figure 1:
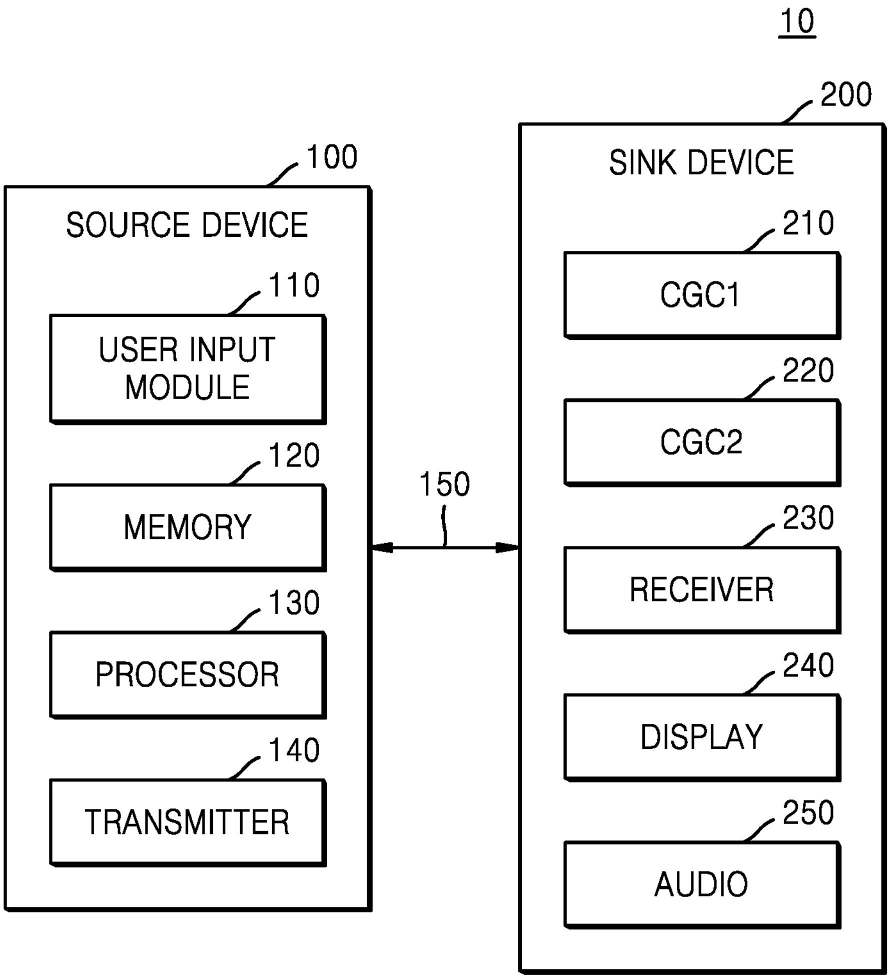
FIG. 1 is a block diagram of a video system according to an embodiment.

FIG. 1 is a block diagram of a video system 10 according to an embodiment.

Referring to FIG. 1, the video system 10 may include a source device 100 and a sink device 200. According to an embodiment, the video system 10 may further include general-purpose components in addition to the components illustrated in FIG. 1.

The source device 100 may directly generate content data or receive content data. The source device 100 may be realized as various types of devices, such as an optical media player, such as a digital versatile disc (DVD) or Blu-ray, an ultra-high definition (UHD) player, a set-top box, a television (TV), a desktop of a computer, a mobile device, a home theater, a gate machine, a content server, etc. The content data may include video data or audio data. Alternatively, the content data may include video data and audio data.

According to an embodiment, the source device 100 may include a user input module 110, a memory 120, a processor 130, and a transmitter 140.

The user input module 110 allows users to interact and perform manipulations. The user input module 110 may include various types of input interface-related circuits. For example, the user input module 110 may be realized as various types, such as a mechanical or an electronic button of the source device 100, a remote controller separated from a main body of the source device 100, a touch pad, a touch screen, etc.

The memory 120 may read stored data and output the read data according to control by the processor 130. Alternatively, the memory 120 may store data according to control by the processor 130. The memory 120 may store the content data. The memory 120 may be realized as a nonvolatile memory that stores data in the absence of power supply or a volatile memory that loses data in the absence of power. The nonvolatile memory may be flash memory and read only memory (ROM), and the flash memory may include, for example, NAND flash memory, NOR flash memory, etc. The volatile memory may include, for example, dynamic random-access memory (DRAM), static random-access memory (SRAM), etc.

The processor 130 may generally control the source device 100. For example, the processor 130 may control the memory 120 to output the content data. The processor 130 may output the content data in a format supported by the sink device 200. The processor 130 may output the video data in a format supported by the sink device 200.

The transmitter 140 may transmit the content data to the sink device 200. The transmitter 140 may transmit the content data to a receiver 230 of the sink device 200. For example, the transmitter 140 may transmit the content data to the receiver 230 through a communication channel 150. For example, the transmitter 140 may transmit the video data to the receiver 230 through the communication channel 150.

The communication channel 150 may transmit the content data output from the source device 100 to the receiver 230. The communication channel 150 may include a wireless or wired communication medium, such as a radio frequency (RF) spectrum, one or more physical transmission lines, or a combination of a wireless medium and a wired medium. The communication channel 150 may form part of a packet-based network, such as a local area network or a global network such as a wide area network or the Internet. The communication channel 150 may indicate a communication medium or a group of different communication media, appropriate for transmitting the content data from the source device 100 to the sink device 200.

The sink device 200 may be an electronic device for processing and playing the content data transmitted from the source device 100. Here, the term "playing" may denote displaying an image according to processed video data, outputting audio according to processed audio data, or displaying the image and the audio according to the processed video data and the processed audio data. The sink device 200 may be realized as various types, such as a TV, a monitor, a portable multimedia player, a mobile phone, a tablet computer, an electronic frame, an electronic blackboard, an electronic advertisement board, etc.

Referring to FIG. 1, the sink device 200 may include a first color gamut compensator 210, a second color gamut compensator 220, the receiver 230, a display 240, and an audio device 250. FIG. 1 illustrates that the first color gamut compensator 210 and the second color gamut compensator 220 are included in the sink device 200. However, the sink device 200 is not necessarily limited thereto. The sink device 200 may include three or more color gamut compensators.

The first color gamut compensator 210 may receive the video data from the source device 100. The video data may be a series of video frames. The video data may include pixel values forming the video frames. According to an embodiment, each of the pixel values may include three pieces of color space data. Each of the pixel values may include first color space data, second color space data, and third color space data. Each of the first color space data, the second color space data, and the third color space data may indicate color information. For example, the first color space data may be red (R) data, the second color space data may be green (G) data, and the third color space data may be blue (B) data.

The first color gamut compensator 210 may convert a color gamut of the pixel values. The first color gamut compensator 210 may compensate for a color gamut of each of the pixel values and may output color gamut data. The color gamut data may be obtained by converting the color gamut of each of the pixel values. For example, the first color gamut compensator 210 may transmit the color gamut data to the display 240.

According to an embodiment, the first color gamut compensator 210 may load a first look-up table storing first conversion data. The first conversion data corresponds to a pixel value that is input to the first color gamut compensator 210. For example, the first look-up table may store the first conversion data corresponding to red (R) data, green (G) data, and blue (B) data that are input to the first color gamut compensator 210. The first conversion data may be used to convert a color gamut of video data including pixel values and may be included in the first look-up table. The first color gamut compensator 210 may load the first look-up table corresponding to a color gamut mode. The color gamut mode may be selected according to an internal setting of the sink device 200 or a user's setting.

The first color gamut compensator 210 may convert the color gamut of each of the pixel values based on the first look-up table. The sink device 200 may include a memory, and the memory of the sink device 200 may store the look-up tables. The first color gamut compensator 210 may load the first look-up table from the memory included in the sink device 200. For example, the first color gamut compensator 210 may load the first look-up table in an internal memory of the first color gamut compensator 210 from the memory included in the sink device 200. However, a method by which the first color gamut compensator 210 loads the first look-up table is not necessarily limited thereto.

The second color gamut compensator 220 may receive video data including pixel values from the source device 100. The second color gamut compensator 220 may convert a color gamut of the pixel values. The second color gamut compensator 220 may compensate for a color gamut of each of the pixel values and may output color gamut data. The color gamut data may be obtained by converting the color gamut of each of the pixel values. For example, the second color gamut compensator 220 may transmit the color gamut data to the display 240.

According to an embodiment, the second color gamut compensator 220 may load a second look-up table storing second conversion data. The second conversion data corresponds to a pixel value that is input to the second color gamut compensator 220. The second conversion data may be used to convert a color gamut of the video data including the pixel values and may be included in the second look-up table. The second color gamut compensator 220 may load the second look-up table corresponding to a color gamut mode. The color gamut mode may be selected according to an internal setting of the sink device 200 or a user's setting.

According to an embodiment, the second color gamut compensator 220 may load the second look-up table when the second color gamut compensator 220 is in an idle state. The idle state may be a state in which an image processor corresponding to the second color gamut compensator 220 does not perform an image processing operation on the video data. The image processor corresponding to the second color gamut compensator 220 may be included in the sink device 200. The idle state will be described in more detail below with reference to FIG. 3.

The second color gamut compensator 220 may convert the color gamut of each of the pixel values based on the second look-up table. For example, the second color gamut compensator 220 may load the second look-up table in an internal memory of the second color gamut compensator 220 and convert the color gamut of each of the pixel values by using the second look-up table.

Any one of the first color gamut compensator 210 and the second color gamut compensator 220 may convert the color gamut of each of the pixel values based on at least one of the first look-up table and the second look-up table. According to an embodiment, when the second color gamut compensator 220 is in an idle state, the first color gamut compensator 210 may convert the color gamut of each of the pixel values by using at least one of the first look-up table and the second look-up table. For example, when the second color gamut compensator 220 is in the idle state, the first color gamut compensator 210 may convert the color gamut of the pixel value by using the first look-up table. As another example, when the second color gamut compensator 220 is in the idle state, the first color gamut compensator 210 may convert the color gamut of the pixel value by using the first look-up table and the second look-up table loaded by the second color gamut compensator 220. By using the second look-up table loaded by the second color gamut compensator 220 in the idle state, the color gamut of the pixel value may be finely converted without using an additional color gamut compensator.

According to an embodiment, with respect to an area of the display 240, on which each of the pixel values is displayed, at least one of the first color gamut compensator 210 and the second color gamut compensator 220 may convert the color gamut of each of the pixel values. The first color gamut compensator 210 may convert the color gamut of the pixel value displayed on a first area of the display 240. The second color gamut compensator 220 may convert the color gamut of the pixel value displayed on a second area of the display 240. For example, the first color gamut compensator 210 may convert the color gamut of the pixel value displayed on the first area based on the first look-up table. The second color gamut compensator 220 may convert the color gamut of the pixel value displayed on the second area based on the second look-up table.

Each of the first color gamut compensator 210 and the second color gamut compensator 220 may be a data processing device capable of processing data, such as a central processing unit (CPU), a graphics processing unit (GPU), a processor, a microprocessor, or an application processor (AP). According to an embodiment, the first color gamut compensator 210 and/or the second color gamut compensator 220 may be realized as a system on a chip (SoC) and may be embedded in an electronic device, such as the sink device 200.

The receiver 230 may receive the content data from the source device 100 through the communication channel 150. The first color gamut compensator 210 may receive the video data through the receiver 230. The second color gamut compensator 220 may receive the video data through the receiver 230.

The transmitter 140, the communication channel 150, and the receiver 230 may be configured for communication according to any wired or wireless communication system including one or more Ethernet, telephone, cable, power-line and fiber optic systems and/or time division multiple access (TDMA) systems such as one or more code division multiple access (CDMA or CDMA2000) communication systems, frequency division multiple access (FDMA) systems, orthogonal frequency division multiple (OFDM) access systems, and global mobile communication (GSM) systems, a General Packet Radio Service (GPRS) or Enhanced Data GSM Environment (EDGE), and Terrestrial Trunked Radio (TETRA) Mobile Telephone System, a Wideband Code Division Multiple Access (WCDMA) System, a High Data Rate 1×EV-DO (1st Generation Evolution Data Only) or 1×EV-DO Gold Multicast System, an IEEE 802.18 System, a digital multimedia broadcasting (DMB) System, a digital video broadcasting (DVB)-H system or a wireless system including other schemes for data communication between two or more devices.

The display 240 may display an image based on the pixel values. Each of the pixel values may be displayed on at least an area of the display 240. The display 240 may display the image based on the color gamut data received from the first color gamut compensator 210 and/or the second color gamut compensator 220. The display 240 may display the image based on at least one of the color gamut data obtained by the first color gamut compensator 210 by converting the color gamut of the pixel value and the color gamut data obtained by the second color gamut compensator 220 by converting the color gamut of the pixel value.

The sink device 200 may display video data, which include the pixel value that has undergone color gamut conversion, through the display 240 for a user to view. The display 240 may be a display panel. The display panel may be a display portion on which an actual image is displayed and may be any one of displays for displaying a two-dimensional (2D) image by receiving electronically transmitted image signals, such as a thin-film transistor-liquid crystal display (TFT-LCD), an organic light-emitting diode (OLED) display, a field emission display, a plasma display panel (PDP), etc. The display panel may be realized as other types of flat displays or flexible display panels. According to an embodiment, the display 240 may display an image of a level of 8K, but is not necessarily limited thereto.

The audio device 250 may output audio based on the audio data transmitted from the source device 100.

Figure 2:
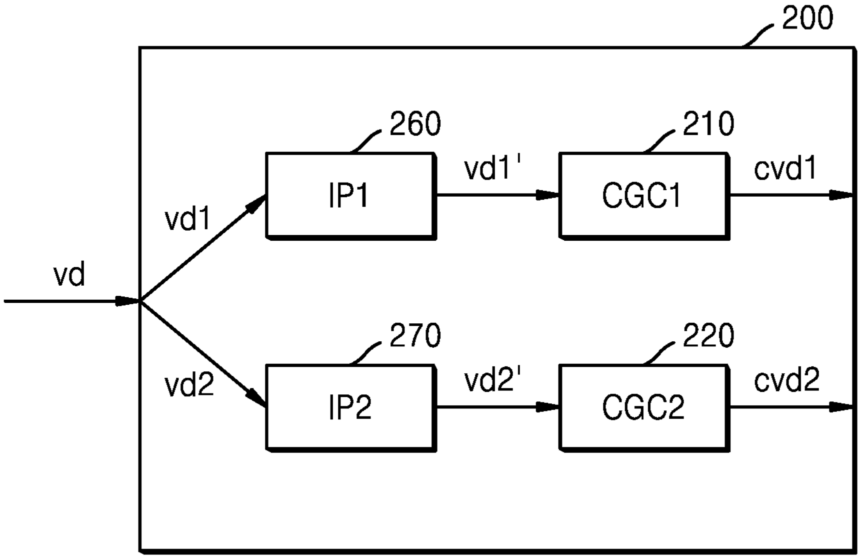
FIG. 2 is a diagram for describing a color gamut compensator in a normal state according to an embodiment.

FIG. 2 is a diagram for describing a color gamut compensator in a normal state, according to an embodiment. An electronic device 200 of FIG. 2 may correspond to the sink device 200 of FIG. 1, and thus, the same descriptions are not repeated.

Referring to FIG. 2, the electronic device 200 may receive video data vd. The video data vd may be a series of video frames. The video data vd may include pixel values forming the video frames. The electronic device 200 may receive the video data vd and segment the video data vd to perform image processing. The video data vd may include a plurality of pieces of video data vd1 and vd2. The video data vd may include the plurality of pieces of video data vd1 and vd2 according to a resolution, a frame rate, etc. of the video data vd. For example, the video data vd may include at least one of first video data vd1 and second video data vd2. The first video data vd1 and the second video data vd2 may be separately routed upon receipt at the electronic device 200.

Each of the first video data vd1 and the second video data vd2 may include pixel values forming video frames included in each of the first video data vd1 and the second video data vd2. Each of the pixel values may be represented as an RGB color space. Each of the pixel values may include first color space data, second color space data, and third color space data. For example, the first color space data may be red (R) data, the second color space data may be green (G) data, and the third color space data may be blue (B) data. Each of the pixel values may be also represented as a YCbCR color space. In this case, each of the pixel values may include luminance data, blue color difference data, and red color difference data. For example, the first color space data may be the luminance data, the second color space data may be the blue color difference data, and the third color space data may be the red color difference data.

Each piece of data included in each pixel value may have various numbers of bits. For example, each piece of data included in each pixel value may be represented as 8 bits. When one of the pixel values is RGB data, each of red data, green data, and blue data may have one level from among 256 levels. For example, the RGB data, which is (255, 255, 255), may indicate a white color, and the RGB data, which is (0,0,0) may indicate a black color. However, the RGB data is not necessarily limited thereto.

The electronic device 200 may perform an image processing operation and a color gamut conversion operation on the video data vd having high specification or high image quality. The electronic device 200 may include a plurality of image processors 260 and 270 and a plurality of color gamut compensators 210 and 220 to perform the image processing operation and the color gamut conversion operation on the video data vd. Referring to FIG. 2, the electronic device 200 may include a first image processor 260, a second image processor 270, a first color gamut compensator 210, and a second color gamut compensator 220. FIG. 2 illustrates that the electronic device 200 includes two image processors and two color gamut compensators. However, the electronic device 200 is not necessarily limited thereto. For example, the electronic device 200 may include more than two image processors and more than two color gamut processors.

The electronic device 200 may segment the video data vd into the plurality of pieces of video data vd1 and vd2 and may perform an image processing operation and a color gamut conversion operation on the plurality of pieces of video data vd1 and vd2. The electronic device 200 may segment the video data vd into the plurality of pieces of video data vd1 and vd2 according to a resolution, a frame rate, etc. of the video data vd and perform the image processing operation and the color gamut conversion operation on the plurality of pieces of video data vd1 and vd2.

According to an embodiment, the video data vd may be divided into the first video data vd1 and the second video data vd2. For example, the electronic device 200 may segment the video data vd into the first video data vd1 and the second video data vd2 based on the frame rate of the video data vd and may perform the image processing operation and the color gamut conversion operation on the first video data vd1 and the second video data vd2. The first video data vd1 may include first frames of the video data vd, and the second video data vd2 may include second frames of the video data vd. In other words, the second video data vd2 may be video data of the video data vd other than the first video data vd1. For example, when the video data vd is 120 frames per second (FPS), the first video data vd1 may include first to sixtieth frames, and the second video data vd2 may include sixty-first to one hundred twentieth frames. However, the frame rate and the number of frames are not necessarily limited to the examples described above.

The first image processor 260 may receive the first video data vd1. The first image processor 260 may image-process the first video data vd1. Image processing may denote operations of scaling, reducing noise, improving image quality, etc. performed on the video data. The first image processor 260 may image-process the first video data vd1 to generate first compensated video data vd1'. The first compensated video data vd1' may include compensated pixel values obtained by image-processing the pixel values included in the first video data vd1. The first image processor 260 may transmit the first compensated video data vd1' to the first color gamut compensator 210.

The first color gamut compensator 210 may receive the first compensated video data vd1' from the first image processor 260. The first color gamut compensator 210 may correspond to the first image processor 260. In other words, the first color gamut compensator 210 may be communicably coupled to the first image processor 260. The first color gamut compensator 210 may be in a normal state. The normal state may be a state where the image-processed compensated video data is received from the image processor corresponding to the color gamut compensator, and a color gamut conversion operation is performed on the pixel values included in the compensated video data. Thus, for example, the normal state of the first color gamut compensator 210 may correspond to when the first color gamut compensator 210 receives the first compensated video data vd1' from the first image processor 260.

The first color gamut compensator 210 may receive the first compensated video data vd1' from the first image processor 260 and perform the color gamut conversion operation on each of the pixel values included in the first compensated video data vd1'. The first color gamut compensator 210 may generate first color gamut data cvd1 as a result of performing the color gamut conversion operation.

The second image processor 270 may receive the second video data vd2. The second image processor 270 may image-process the second video data vd2. The second image processor 270 may image-process the second video data vd2 to generate second compensated video data vd2'. The second compensated video data vd2' may include compensated pixel values obtained by image-processing the pixel values included in the second video data vd2. The second image processor 270 may transmit the second compensated video data vd2' to the second color gamut compensator 220.

The second color gamut compensator 220 may receive the second compensated video data vd2' from the second image processor 270. The second color gamut compensator 220 may correspond to the second image processor 270. For example, the second color gamut compensator 220 may be communicably coupled to the second image processor 270. The second color gamut compensator 220 may be in a normal state. In the normal state, the second color gamut compensator 220 may receive the second compensated video data vd2' from the second image processor 270 and perform the color gamut conversion operation on each of the pixel values included in the second compensated video data vd2'. The second color gamut compensator 220 may generate second color gamut data cvd2 as a result of performing the color gamut conversion operation.

Figure 3:
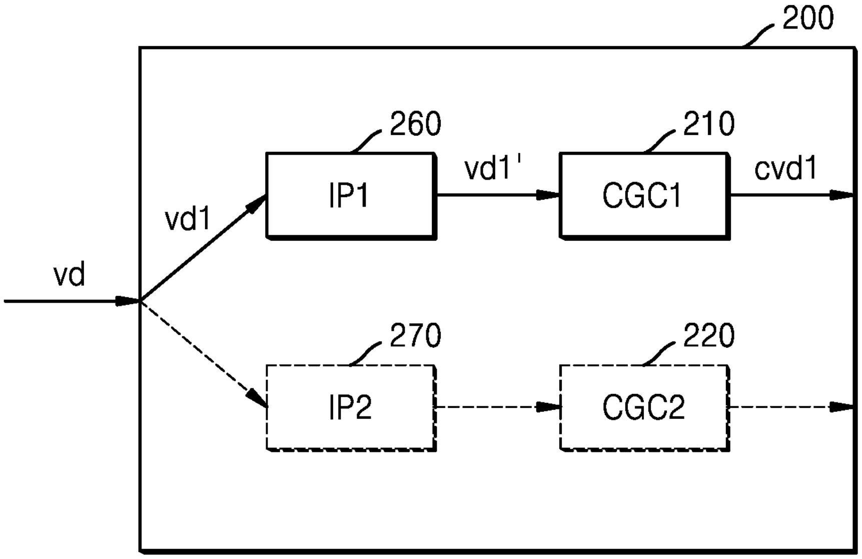
FIG. 3 is a diagram for describing a color gamut compensator in an idle state according to an embodiment.

FIG. 3 is a diagram for describing a color gamut compensator in an idle state according to an embodiment. The same aspects as described above will not be described.

Referring to FIG. 3, the electronic device 200 may receive the video data vd. The electronic device 200 may receive the video data vd and segment the video data vd to perform image processing. The video data vd may include at least one of the first video data vd1 and the second video data vd2. For example, the video data vd may include the first video data vd1.

The electronic device 200 may perform an image processing operation and a color gamut conversion operation on the video data vd having high specification or high image quality. The electronic device 200 may include the plurality of image processors 260 and 270 and the plurality of color gamut compensators 210 and 220 to perform the image processing operation and the color gamut conversion operation on the video data vd. Referring to FIG. 3, the electronic device 200 may include the first image processor 260, the second image processor 270, the first color gamut compensator 210, and the second color gamut compensator 220. FIG. 3 illustrates that the electronic device 200 includes two image processors and two color gamut compensators. However, the electronic device 200 is not necessarily limited thereto.

According to an embodiment, the video data vd may include the first video data vd1. For example, the electronic device 200 may perform the image processing operation by segmenting the video data vd based on a frame rate of the video data vd. The electronic device 200 may perform the image processing operation and the color gamut conversion operation on the first video data vd1. The first video data vd1 may include a predetermined number of first frames of the video data vd. For example, when the video data vd is 60 FPS, the first video data vd1 may include first to sixtieth frames. Because the video data vd includes 60 frames, there may be no other frames included in the first video data vd1. Thus, the video data vd may only include the first video data vd1.

The first image processor 260 may receive the first video data vd1. The first image processor 260 may image-process the first video data vd1. The first image processor 260 may image-process the first video data vd1 to generate the first compensated video data vd1'. The first compensated video data vd1' may include compensated pixel values obtained by image-processing pixel values included in the first video data vd1.

The first color gamut compensator 210 may receive the first compensated video data vd1' from the first image processor 260. The first color gamut compensator 210 may correspond to the first image processor 260. The first color gamut compensator 210 may be in a normal state. The first color gamut compensator 210 may receive the first compensated video data vd1' from the first image processor 260 and perform the color gamut conversion operation on each of pixel values included in the first compensated video data vd1'. The first color gamut compensator 210 may generate the first color gamut data cvd1 as a result of performing the color gamut conversion operation.

The second image processor 270 may not receive the video data vd. The video data vd may not be segmented according to a resolution, a frame rate, etc. of the video data vd and may not be image-processed by each of the first image processor 260 and the second image processor 270. When it is sufficient to image-process the video data vd by using the first image processor 260, the video data vd may not be received by the second image processor 270. In other words, the video data vd may not be received by the second image processor 270 if it is sufficient to process the video data vd using the first image processor 260. When the second image processor 270 does not receive the video data vd, it does not image-process the video data vd. An idle state of the image processor may be a state in which the video data is not received, and thus, the image processor may not perform image processing. Since the second image processor 270 does not receive the video data vd and thus does not perform image processing on the video data vd, the second image processor 270 is in the idle state. As a consequence, the second image processor 270 does not generate second compensated video data.

The second color gamut compensator 220 may correspond to the second image processor 270. The second color gamut compensator 220 may be in an idle state. When the second image processor 270 is in the idle state, the second color gamut compensator 220 corresponding to the second image processor 270 may also be in the idle state. The idle state of the color gamut compensator may be a state in which the image processor corresponding to the color gamut compensator does not receive the video data and does not perform the image processing operation on the video data.

The color gamut compensator in the idle state may be a color gamut compensator corresponding to an image processor that does not perform image processing on the video data vd from among the plurality of image processors 260 and 270. For example, the image processor not performing image processing on the video data vd may be the second image processor 270, which is in the idle state. The color gamut compensator in the idle state may be the second color gamut compensator 220 corresponding to the second image processor 270.

The second color gamut compensator 220 may not receive the second compensated video data from the second image processor 270. The second color gamut compensator 220 may be in the idle state, in which the second color gamut compensator 220 does not perform the color gamut conversion operation on pixel values included in the second compensated video data. The second color gamut compensator 220 may not generate second color gamut data.

Figure 4:
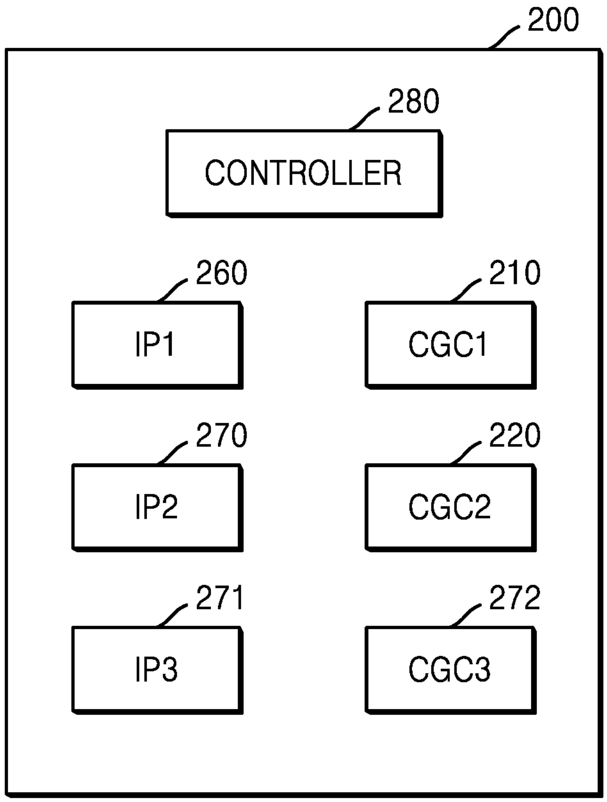
FIG. 4 is a block diagram of an electronic device according to an embodiment.

FIG. 4 is a block diagram of the electronic device 200 according to an embodiment. The same aspects as described above will not be described.

Referring to FIG. 4, the electronic device 200 may include a controller 280. The electronic device 200 may include a first image processor 260, a second image processor 270, a third image processor 271, a first color gamut compensator 210, a second color gamut compensator 220, and a third color gamut compensator 272. The first image processor 260, the second image processor 270, and the third image processor 271 may correspond to the first color gamut compensator 210, the second color gamut compensator 220, and the third color gamut compensator 272, respectively. In other words, the first image processor 260 is connected to the first color gamut compensator 210, the second image processor 270 is connected to the second color gamut compensator 220, and the third image processor 271 is connected to the third color gamut compensator 272. FIG. 3 illustrates that the electronic device 200 includes the first to third image processors 260, 270, and 271 and the first to third color gamut compensators 210, 220, and 272. However, the electronic device 200 is not necessarily limited thereto. The electronic device 200 may include various numbers of image processors and color gamut compensators.

The controller 280 may select an image processor to perform an image processing operation on video data, based on information of the video data received by the electronic device 200. The information of the video data may be a resolution, a frame rate, etc. of the video data. For example, when the frame rate of the video data is 120 FPS, the controller 280 may control the first image processor 260 and the second image processor 270 to perform image processing on the video data. The first image processor 260 may perform image processing on the first 60 frames, and the second image processor 270 may perform image processing on the next 60 frames. The first image processor 260 and the second image processor 270 may be in a normal state, and the third image processor 271 may be in an idle state. In this case, the third image processor 271 may not perform image processing on the video data. As another example, the controller 280 may select just the first image processor 260 to perform image processing on the video data. In this case, the second image processor 270 and the third image processor 271 may be in an idle state.

A color gamut compensator corresponding to the image processor selected by the controller 280 may perform a color gamut conversion operation. The controller 280 may control the color gamut compensator corresponding to the selected image processor to perform the color gamut conversion operation. The color gamut compensator corresponding to the image processor selected by the controller 280 may be a main color gamut compensator. The main color gamut compensator may be a color gamut compensator which is not in the idle state. For example, when the controller 280 selects the first image processor 260 to perform image processing on the video data, the first color gamut compensator 210 corresponding to the first image processor 260 may be in a normal state. The first color gamut compensator 210 may be the main color gamut compensator. The second color gamut compensator 220 and the third color gamut compensator 272 may be in the idle state. As another example, when the controller 280 selects the first image processor 260 and the second image processor 270, the main color gamut compensator may include the first color gamut compensator 210 and the second color gamut compensator 220.

According to an embodiment, based on the information of the video data, the controller 280 may select at least one auxiliary color gamut compensator, which is in the idle state, from among the plurality of color gamut compensators. The controller 280 may select at least one of the color gamut compensators in the idle state as the auxiliary color gamut compensator.

The auxiliary color gamut compensator may be the at least one of the color gamut compensators in the idle state and may convert a color gamut of at least one of compensated pixel values or may assist the main color gamut compensator in converting the color gamut of the compensated pixel values. The compensated pixel value may be a pixel value included in the video data image-processed by the image processor corresponding to the main color gamut compensator. For example, when the second color gamut compensator 220 and the third color gamut compensator 272 are in the idle state, the controller 280 may select the second color gamut compensator 220 as the auxiliary color gamut compensator. As another example, the controller 280 may select both the second color gamut compensator 220 and the third color gamut compensator 272 as the auxiliary color gamut compensator.

The auxiliary color gamut compensator may load a look-up table. The auxiliary color gamut compensator may load a look-up table different from a look-up table loaded by the main color gamut compensator. For example, when the first color gamut compensator 210 is the main color gamut compensator, and the second color gamut compensator 220 is the auxiliary color gamut compensator, the second color gamut compensator 220 may load a second look-up table. The second look-up table may be different from a first look-up table loaded by the first color gamut compensator 210.

According to an embodiment, at least one of the main color gamut compensator and the at least one auxiliary color gamut compensator may convert the color gamut of each of the compensated pixel values. For example, when the first color gamut compensator 210 is the main color gamut compensator, and the second color gamut compensator 220 is the auxiliary color gamut compensator, the first color gamut compensator 210 may convert a color gamut of a first compensated pixel value by using the first look-up table, and the second color gamut compensator 220 may convert a color gamut of a second compensated pixel value by using the second look-up table. As another example, when the first color gamut compensator 210 is the main color gamut compensator, and the second color gamut compensator 220 is the auxiliary color gamut compensator, the first color gamut compensator 210 may convert the color gamut of the first compensated pixel value by using the second look-up table loaded by the second color gamut compensator 220.

The controller 280 may include one or more from among a CPU, a GPU, and an AP. The controller 280 may control at least another component of the electronic device 200 and/or perform an operation or data processing with respect to data communication.

Figure 5:
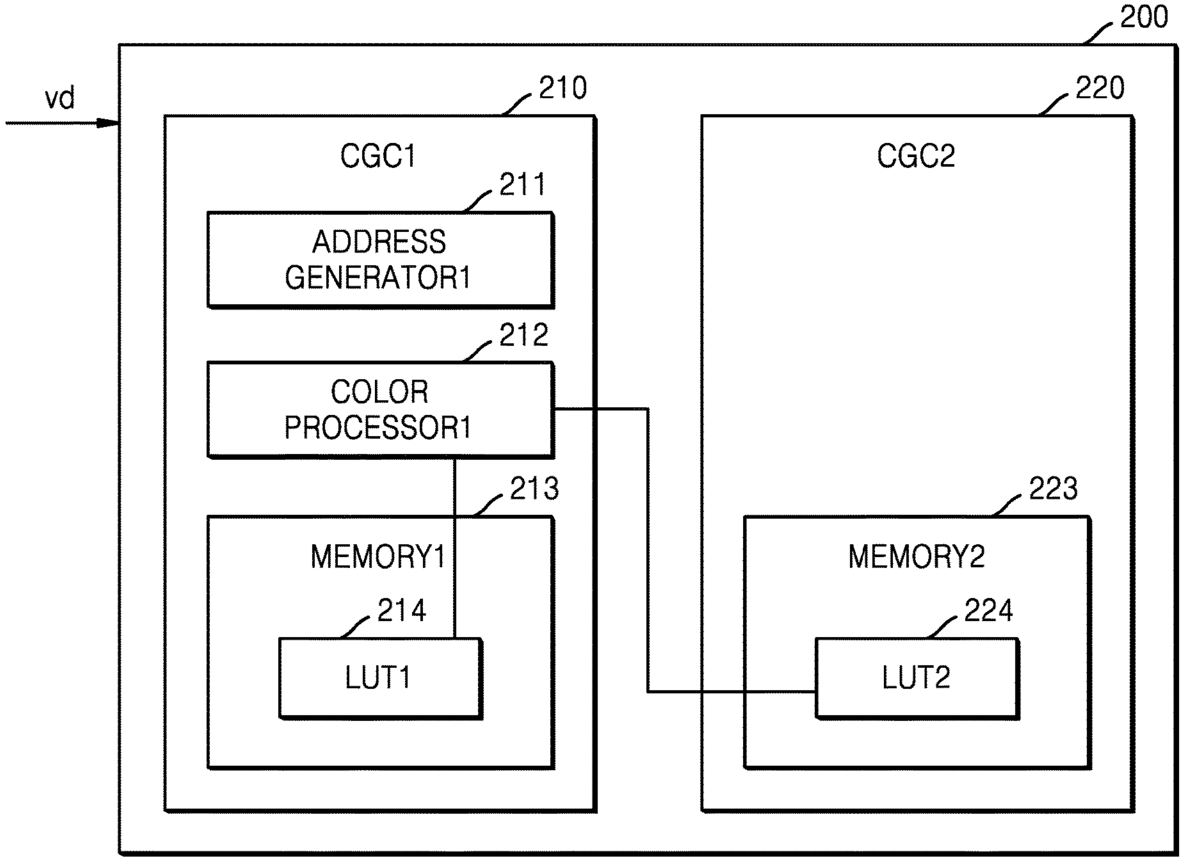
FIG. 5 is a block diagram of a color gamut compensator according to an embodiment.

FIG. 5 is a block diagram of a color gamut compensator according to an embodiment. The same aspects as described above will not be described.

Referring to FIG. 5, the electronic device 200 may include the first color gamut compensator 210 and the second color gamut compensator 220. In FIG. 5, it is assumed that the first color gamut compensator 210 is in a normal state, and the second color gamut compensator 220 is in an idle state. The first color gamut compensator 210 may be a main color gamut compensator, and the second color gamut compensator 220 may be an auxiliary color gamut compensator. The first color gamut compensator 210 may receive video data vd from an image processor corresponding to the first color gamut compensator 210, and the second color gamut compensator 220 may not receive the video data vd from an image processor corresponding to the second color gamut compensator 220.

The electronic device 200 may receive the video data vd. The video data vd may include pixel values. The first color gamut compensator 210 may load a first look-up able 214. The second color gamut compensator 220 may load a second look-up table 224, when the second color gamut compensator 220 is in an idle state. According to an embodiment, the first color gamut compensator 210 may convert a color gamut of each of the pixel values by using at least one of the first look-up table 214 and the second look-up table 224, when the second color gamut compensator 220 is in the idle state. For example, the first color gamut compensator 210 may convert the color gamut of a first pixel value by using the first look-up table 214 and may convert the color gamut of a second pixel value by using the second look-up table 224.

Referring to FIG. 5, the first color gamut compensator 210 may include a first address generator 211, a first color processor 212, and a first memory 213. The first color gamut compensator 210 may further include other components. The first address generator 211 may calculate a location of a look-up table, in which conversion data corresponding to each piece of color space data included in the pixel value is stored.

Based on each pixel value, the first address generator 211 may identify the look-up table where the conversion data corresponding to each pixel value is stored. The first address generator 211 may generate an address of the look-up table storing the conversion data corresponding to each pixel value. For example, the first address generator 211 may determine that the conversion data corresponding to a first pixel value is stored in the first look-up table 214 and may generate the address corresponding to the first conversion data. As another example, the first address generator 211 may determine that the conversion data corresponding to a second pixel value is stored in the second look-up table 224 and may generate the address corresponding to the second conversion data.

According to an embodiment, the first address generator 211 may generate an address for storing the conversion data corresponding to each pixel value, by using upper n (n is a positive number) bits from among k (k is a positive number) bits of each pixel value. For example, when each pixel value is represented as an RGB color space, and each piece of RGB data is 8 bits, the first address generator 211 may generate the address for storing the conversion data corresponding to each pixel value by using the upper 3 bits from among the 8 bits.

There may be a plurality of pieces of conversion data corresponding to each pixel value. First conversion data may be extracted from the first look-up table based on the first pixel value. In a color space area, the first conversion data corresponding to a vertex of a hexahedron surrounding the first pixel value may be obtained from the first look-up table. The first color gamut compensator 210 may generate the address indicating the conversion data corresponding to 8 vertexes of the hexahedron surrounding the first pixel value and may obtain the conversion data corresponding to the 8 vertexes based on the address. Here, the address may be generated by the first address generator 211.

The first color processor 212 may obtain, based on the address generated by the first address generator 211, the conversion data corresponding to each pixel value from at least one of the first look-up table 214 and the second look-up table 224. For example, the first color processor 212 may obtain, based on the address, the first conversion data corresponding to a third pixel value from the first look-up table 214. The first color processor 212 may obtain, based on the address, the second conversion data corresponding to a fourth pixel value from the second look-up table 224.

The first color processor 212 may convert a color gamut of each pixel value based on the conversion data. According to an embodiment, the first color processor 212 may convert the color gamut of each pixel value by using interpolation, based on at least one of the first look-up table and the second look-up table. The first color processor 212 may convert the color gamut of each pixel value by using interpolation based on the obtained conversion data. For example, the first color processor 212 may convert the color gamut of each pixel value by using the obtained conversion data and tetrahedral interpolation. However, the interpolation is not necessarily limited thereto.

According to an embodiment, the first color processor 212 may convert the color gamut of each pixel value based on at least one of the first conversion data and the second conversion data and lower m (m is a positive number) bits from among k (k is a positive number) bits of each pixel value. The first color processor 212 may obtain the conversion data corresponding to each pixel value and may convert the color gamut of each pixel value based on the obtained conversion data and the lower m bits. For example, the first color processor 212 may obtain the first conversion data corresponding to a fifth pixel value and convert a color gamut of the fifth pixel value based on the first conversion data and the lower 5 bits of the fifth pixel value.

The first color processor 212 may convert the color gamut of each pixel value by using interpolation based on the obtained conversion data and the lower m bits of the pixel value. The first color processor 212 may convert the color gamut of each pixel value and output color gamut data.

The first memory 213 may load the first look-up table 214. The first look-up table 214 may store the first conversion data for converting the color gamut of each pixel value. For example, the first look-up table 214 may store the conversion data for converting a color gamut of each compensated pixel value received from the first image processor. The first memory 213 may be realized as a nonvolatile memory or a volatile memory. For example, the first memory 213 may be DRAM.

The second color gamut compensator 220 may be an auxiliary color gamut compensator. The second color gamut compensator 220 may include a second memory 223. The first color gamut compensator 210 may further include other components. The second memory 223 may be realized as a nonvolatile memory or a volatile memory. For example, the second memory 223 may be DRAM.

The second memory 223 may load the second look-up table 224. The second look-up table 224 may store the second conversion data for converting the color gamut of each pixel value. According to an embodiment, the second color gamut compensator 220 may load the second look-up table 224 which is different from the first look-up table 214 loaded by the first color gamut compensator 210.

The first color processor 212 may obtain the second conversion data from the second look-up table 224 loaded by the second memory 223, based on the address generated by the first address generator 211. The first color processor 212 may read the second conversion data from the second look-up table 224 loaded by the second memory 223, based on the address.

The first color gamut compensator 210 may convert the color gamut of the pixel value based on at least one of the first look-up table 214 loaded by the first color gamut compensator 210 in the normal state and the second look-up table 224 loaded by the second color gamut compensator 220 in an idle state. The different look-up tables may be applied according to the pixel value, and thus, without using an additional color gamut compensator, a color of an image may be accurately and precisely represented.

Figure 6A:
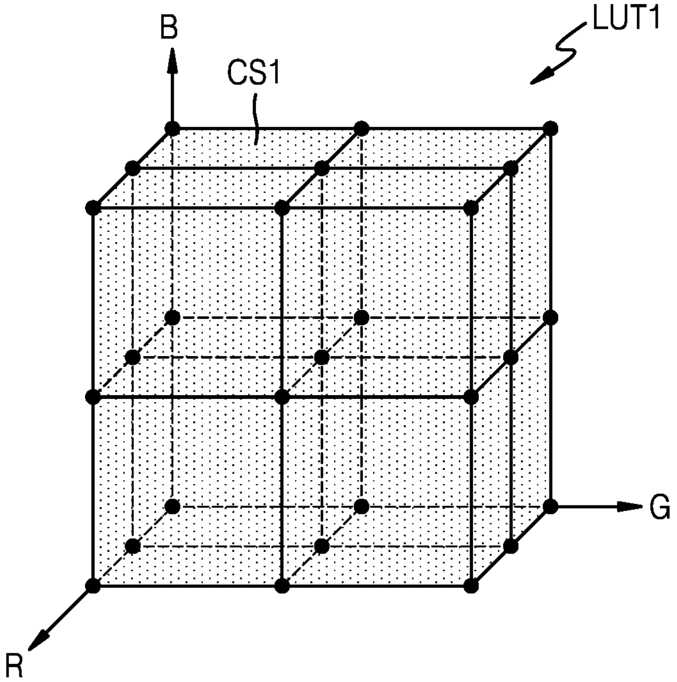
FIG. 6A is a diagram for describing a first look-up table according to an embodiment.

FIG. 6A is a diagram for describing a first look-up table LUT1 according to an embodiment. The same aspects as described above will not be described.

Referring to FIG. 6A, the first look-up table LUT1 may be three-dimensionally represented in a color space area CS1. FIG. 6A illustrates that the color space area CS1 includes 27 points. However, this is only for convenience, and the color space area CS1 is not limited thereto. For example, the color space CS1 may include more or less than 27 points.

The first look-up table LUT1 may be formed by using the upper n bits of each piece of RGB data of a pixel value. For example, when each piece of RGB data is 8 bits, the first look-up table LUT1 may be formed by using the upper 3 bits of each piece of RGB data. The first look-up table LUT1 may form the color space area CS1 by using 512 points.

The first look-up table LUT1 may include first conversion data corresponding to the points included in the color space area CS1. The first look-up table LUT1 may include pieces of first conversion data corresponding to vertexes of hexahedrons included in the color space area CS1. For example, the first look-up table LUT1 may include the pieces of first conversion data corresponding to 27 vertexes, respectively. In other words, the first look-up table LUT1 may include a piece of first conversion data for each of the 27 vertexes. The first look-up table LUT1 may include a plurality of sub-first look-up tables which form the three-dimensional first look-up table LUT1. The plurality of sub-first look-up tables may provide the first conversion data corresponding to the vertex.

The vertexes included in the color space area CS1 may be color space data corresponding to the first conversion data stored in the first look-up table LUT1. The color space data corresponding to the first conversion data may be RGB data. The color space data corresponding to the first conversion data may be included in the color space area CS1.

Figure 6B:
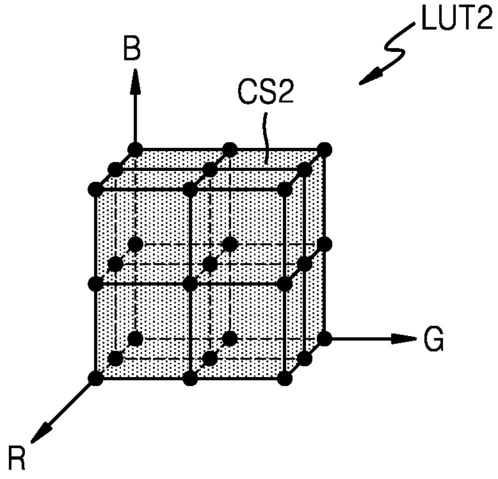
FIG. 6B is a diagram for describing a second look-up table according to an embodiment.

FIG. 6B is a diagram for describing a second look-up table LUT2 according to an embodiment. The same aspects as described above will not be described.

Referring to FIG. 6B, the second look-up table LUT2 may be three-dimensionally represented in a color space area CS2. FIG. 6B illustrates that the color space area CS2 includes 27 points. However, this is only for convenience, and the color space area CS2 is not limited thereto.

The second look-up table LUT2 may be formed by using the upper n bits of each piece of RGB data of the pixel value. For example, when each piece of RGB data is 8 bits, the second look-up table LUT2 may be formed by using the upper 3 bits of each piece of RGB data. The second look-up table LUT2 may form the color space area CS2 by using 512 points. The second look-up table LUT2 may include pieces of second conversion data corresponding to vertexes of hexahedrons included in the color space area CS2.

The vertexes included in the color space area CS2 may be color space data corresponding to the second conversion data stored in the second look-up table LUT2. The color space data corresponding to the second conversion data may be RGB data. The color space data corresponding to the second conversion data may be included in the color space area CS2.

Referring to FIG. 6A together with FIG. 6B, the color space area CS2 including the color space data corresponding to the second conversion data and the color space area CS1 including the color space data corresponding to the first conversion data may be different from each other. According to an embodiment, the color space area CS2 may be less than the color space area CS1. The color space area CS2 may be part of color space area CS1. For example, RGB data (0, 0, 255) may be included in the color space area CS1, but may not be included in the color space area CS2.

Figure 7:
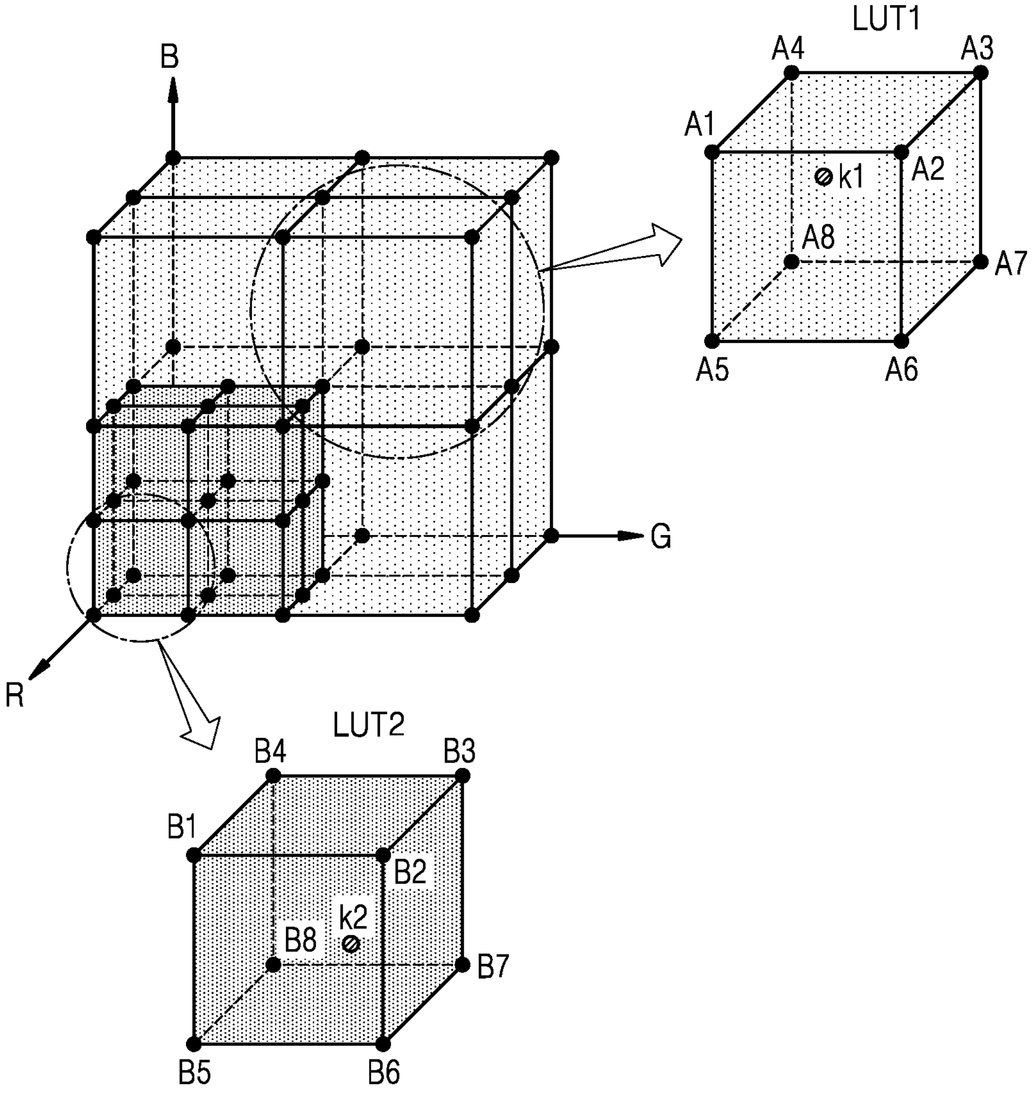
FIG. 7 is a diagram for describing an operation of a first color gamut compensator, according to an embodiment.

FIG. 7 is a diagram for describing an operation of a first color gamut compensator, according to an embodiment. FIG. 7 illustrates both the first look-up table LUT1 and the second look-up table LUT2. The same aspects as described above will not be described.

The first color gamut compensator may convert a color gamut of each of pixel values by using at least one of the first look-up table LUT1 and the second look-up table LUT2, when a second color gamut compensator is in an idle state. In other words, when the second color gamut compensator is in the idle state, the first color gamut compensator may use the first look-up table LUT1 or the second look-up table LUT2 to convert a color gamut of each of the pixel values. The first color gamut compensator may convert a color gamut of a first pixel value k1. The first pixel value k1 may be one of the pixel values included in video data received by an electronic device (for example, the electronic device 200 of FIG. 4.).

The first color gamut compensator may generate an address indicating in which conversion data corresponding to each pixel value is to be stored. Based on each pixel value, the first color gamut compensator may identify the look-up table where the conversion data corresponding to each pixel value is stored. The first color gamut compensator may generate an address by referencing a look-up table that stores the conversion data for each pixel value. The first color gamut compensator may generate the address that identifies the storage location of the conversion data corresponding to the first pixel value k1. The first color gamut compensator may identify that the first pixel value k1 corresponds to first conversion data and may generate the address according to the first look-up table LUT1 storing the first conversion data.

According to an embodiment, the first color gamut compensator may generate an address for storing the conversion data corresponding to the first pixel value k1 by using upper n (n is a positive number) bits from among k (k is a positive number) bits of the first pixel value k1. The first color gamut compensator may generate an address that identifies conversion data corresponding to each of vertexes of a hexahedron including the first pixel value k1 by using the upper n bits of the first pixel value k1. The first color gamut compensator may generate the address that identifies the conversion data corresponding to first to eighth vertexes A1, A2, A3, A4, A5, A6, A7 and A8, respectively. The conversion data corresponding to the first pixel value k1 may be stored in the first look-up table LUT1. The first color gamut compensator may generate the address that identifies the first conversion data corresponding to the first to eighth vertexes A1 to A8.

The first color gamut compensator may obtain the first conversion data corresponding to the first pixel value k1 from the first look-up table LUT1 based on the address with respect to the first pixel value k1. The first color gamut compensator may obtain the first conversion data corresponding to the first to eighth vertexes A1 to A8 from the first look-up table LUT1.

The first color gamut compensator may convert the color gamut of the first pixel value k1 based on the first conversion data corresponding to the first to eighth vertexes A1 to A8. The first color gamut compensator may convert the color gamut of the first pixel value k1 by using interpolation. The first color gamut compensator may convert the color gamut of the first pixel value k1 based on lower m (m is a positive number) bits of the first pixel value k1. The first color gamut compensator may convert the color gamut of the first pixel value k1 by using interpolation based on the first conversion data corresponding to the first to eighth vertexes A1 to A8 and the lower m bits of the first pixel value k1. The first color gamut compensator may convert the color gamut of the first pixel value k1 and may output color gamut data.

The first color gamut compensator may convert the color gamut of each pixel value by using at least one of the first look-up table LUT1 and the second look-up table LUT2, when the second color gamut compensator is in an idle state. The second color gamut compensator may load the second look-up table LUT2, when the second color gamut compensator is in the idle state. The first color gamut compensator may convert a color gamut of a second pixel value k2 by using at least one of the second look-up table LUT2 loaded by the second color gamut compensator in the idle state and the first look-up table LUT1. The second pixel value k2 may be one of the pixel values included in video data received by the electronic device.

The first color gamut compensator may generate an address that indicates a storage location the conversion data corresponding to the second pixel value k2. The first color gamut compensator may identify that the second pixel value k2 corresponds to second conversion data and may generate an address according to the second look-up table LUT2 that stores the second conversion data.

The first color gamut compensator may generate an address that identifies conversion data corresponding to each of vertexes of a hexahedron including the second pixel value k2 by using upper n bits of the second pixel value k2. The first color gamut compensator may generate the address that identifies the conversion data corresponding to each of first to eighth vertexes B1, B2, B3, B4, B5, B6, B7 and B8. The conversion data corresponding to the second pixel value k2 may be stored in the second look-up table LUT2. The first color gamut compensator may generate the address that identifies the second conversion data corresponding to the first to eighth vertexes B1 to B8.

The first color gamut compensator may obtain the first conversion data corresponding to the second pixel value k2 from the second look-up table LUT2 based on the address corresponding to the second pixel value k2. The first color gamut compensator may obtain the second conversion data corresponding to the first to eighth vertexes B1 to B8 from the second look-up table LUT2.

The first color gamut compensator may convert a color gamut of the second pixel value k2 by using interpolation based on the second conversion data corresponding to the first to eighth vertexes B1 to B8 and lower m bits of the second pixel value k2. The first color gamut compensator may convert the color gamut of the second pixel value k2 and may output color gamut data. The color gamut of the second pixel value k2 may be compensated for by using the second conversion data stored in the second look-up table LUT2, and thus, a color of the second pixel value k2 may be more finely represented than a color of the first pixel value k1.

According to an embodiment, the first color gamut compensator may convert the color gamut of each of the pixel values by using at least one of the first look-up table LUT1 and the second look-up table LUT2. The first color gamut compensator may map the second look-up table LUT2 to a part of the first look-up table LUT1 by using the first look-up table LUT1 and the second look-up table LUT2. The first color gamut compensator may generate the address indicating the location of the conversion data corresponding to each pixel value by using each pixel value and the mapped first look-up table LUT1 and second look-up table LUT2. The first color gamut compensator may obtain the conversion data corresponding to each pixel value based on the address. The color gamut may be compensated for by using the first look-up table LUT1 and the second look-up table LUT2, and thus, colors may be finely represented without using an additional color gamut compensator.

Figure 8:
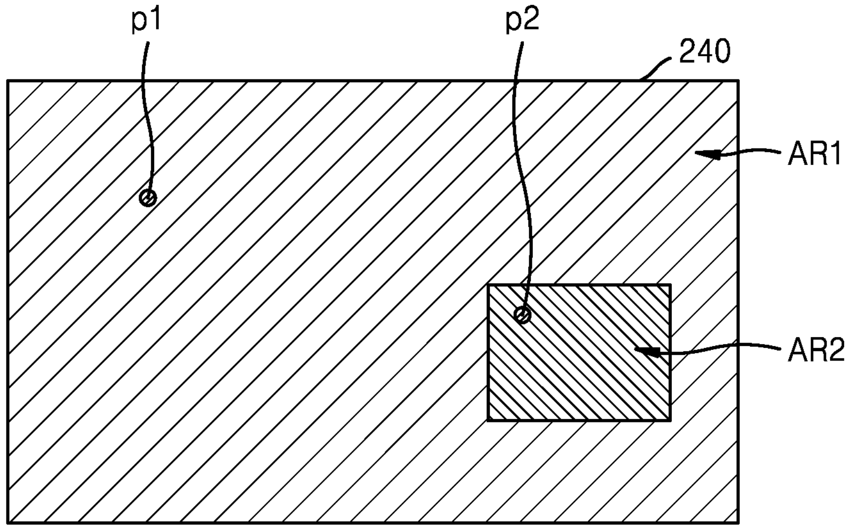
FIG. 8 is a diagram for describing areas of a display according to an embodiment.

FIG. 8 is a diagram for describing areas of a display 240 according to an embodiment. The display 240 of FIG. 8 may correspond to the display 240 of FIG. 1, and thus, the same descriptions are not repeated.

Referring to FIG. 8, the display 240 may include a plurality of areas. The display 240 may include a first area AR1 and a second area AR2. However, the display 240 is not necessarily limited thereto, and the display 240 may be divided into three or more areas or may not be divided.

Each of pixel values included in video data may be displayed on the display 240. Some of the pixel values may be displayed on the first area AR1, and the other pixel values may be displayed on the second area AR2. The pixel value displayed on the first area AR1 of the display 240 from among the pixel values may be a first area pixel value p1. The first area pixel value p1 may be displayed on the first area AR1. The pixel value displayed on the second area AR2 of the display 240 from among the pixel values may be a second area pixel value p2. The second area pixel value p2 may be displayed on the second area AR2. The electronic device (for example, the sink device 200 of FIG. 1) may convert a color gamut of each of the pixel values based on the area of the display 240 where each pixel is displayed. Hereinafter, a method of converting the color gamut of the pixel value based on the area of the display 240 will be described with reference to FIGS. 9A and 9B.

Figure 9A:
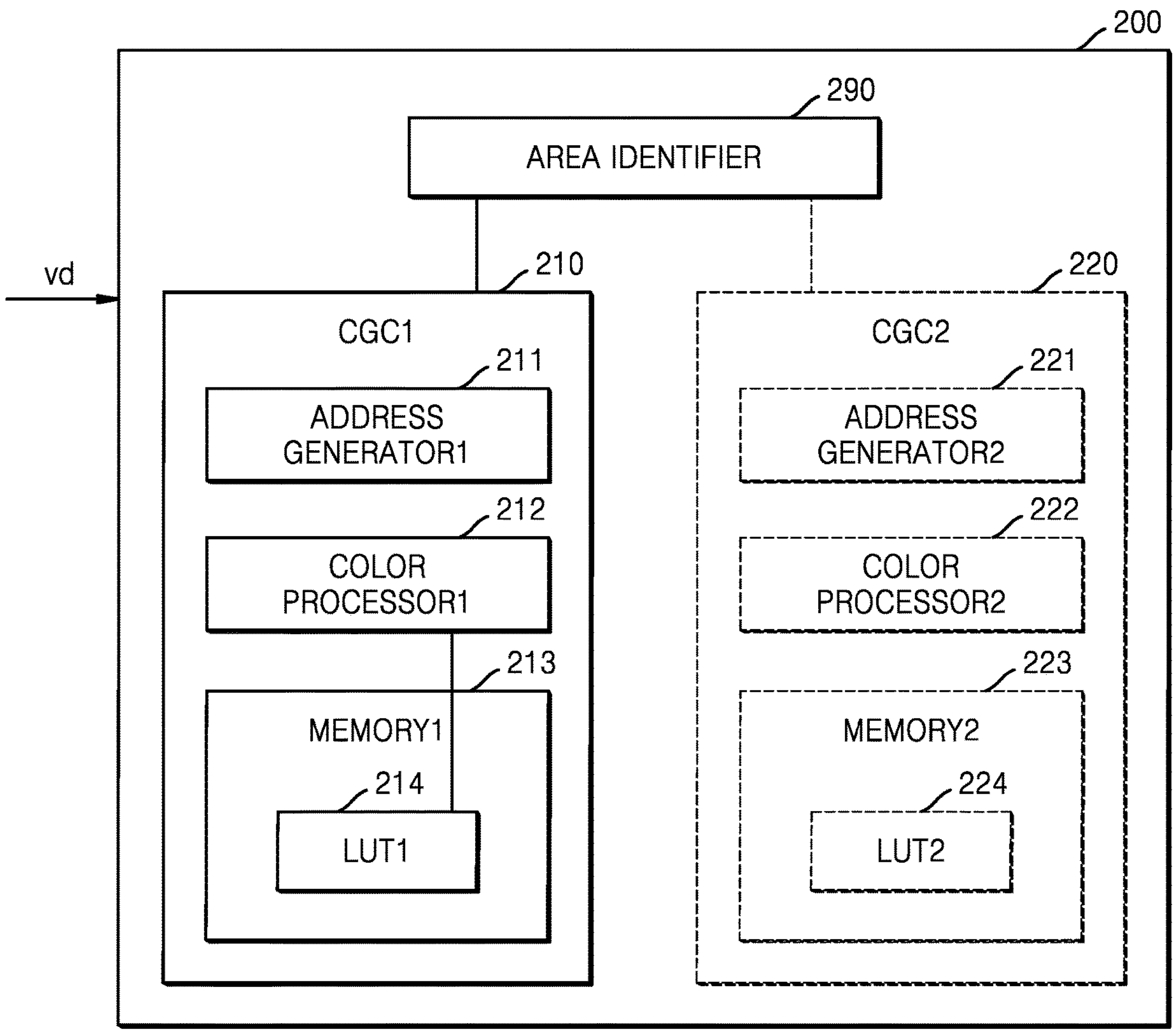
FIG. 9A is a diagram for describing an operation of an electronic device according to an embodiment.

FIG. 9A is a diagram for describing an operation of an electronic device, according to an embodiment. In detail, FIG. 9A illustrates a method, performed by the first color gamut compensator 210, of converting the color gamut of the pixel value. The same aspects as described above will not be described.

Referring to FIG. 9A, the electronic device 200 may include an area identifier 290, the first color gamut compensator 210, and the second color gamut compensator 220. It is assumed that the first color gamut compensator 210 is in a normal state, and the second color gamut compensator 220 is in an idle state. The first color gamut compensator 210 may be a main color gamut compensator, and the second color gamut compensator 220 may be an auxiliary color gamut compensator. Video data vd may be image-processed by a first image processor (for example, the first image processor 260 of FIG. 4) corresponding to the first color gamut compensator 210 and may be transmitted to one of the first color gamut compensator 210 and the second color gamut compensator 220.

The area identifier 290 may identify an area of a display, on which each pixel value is displayed. Referring to FIG. 8 together, the area identifier 290 may identify on which area of the display 240 each pixel value is displayed. The area identifier 290 may identify on which area of the display 240 each pixel value is displayed, based on location information of each pixel value. The location information may be a location of the display 240, on which the pixel value is displayed, and the location information may be included in the video data vd.

The area identifier 290 may identify whether each pixel value is displayed on a first area AR1 or a second area AR2. For example, the area identifier 290 may identify that a first pixel value included in the video data vd is displayed on the first area AR1, and the first pixel value may be a first area pixel value p1.

The area identifier 290 may transmit each pixel value to one of the first color gamut compensator 210 and the second color gamut compensator 220, based on the area where it is located on the display 240. According to an embodiment, the area identifier 290 may transmit the first area pixel value p1 displayed on the first area AR1 to the first color gamut compensator 210. The area identifier 290 may transmit a second area pixel value p2 displayed on the second area AR2 to the second color gamut compensator 220. Hereinafter, it is assumed that the pixel value is the first area pixel value p1.

The area identifier 290 may transmit the first area pixel value p1 to the first color gamut compensator 210. The area identifier 290 may directly transmit the first area pixel value p1 to the first color gamut compensator 210 or may control another component of the electronic device 200 to transmit the first area pixel value p1 to the first color gamut compensator 210. For example, the area identifier 290 may control the first image processor to transmit the first area pixel value p1 image-processed by the first image processor to the first color gamut compensator 210.

The first color gamut compensator 210 may convert the color gamut of the first area pixel value p1 based on the first look-up table 214. In other words, the first color gamut compensator 210 may use the first look-up table 214 to convert the color gamut of the first area pixel value p1. The first color gamut compensator 210 may include the first address generator 211, the first color processor 212, and the first memory 213. The first color gamut compensator 210 may further include other components.

The first address generator 211 may calculate a location of the first look-up table 214, in which first conversion data corresponding to each piece of color space data included in the first area pixel value p1 is stored. The first address generator 211 may generate an address with respect to the first conversion data corresponding to the first area pixel value p1 based on the first look-up table 214.

According to an embodiment, the first address generator 211 may generate the address for storing the first conversion data corresponding to the first area pixel value p1 by using upper n (n is a positive number) bits from among k (k is a positive number) bits of the first area pixel value p1.

The first color processor 212 may obtain the first conversion data corresponding to the first area pixel value p1 from the first look-up table 214 based on the address generated by the first address generator 211. The first color processor 212 may convert the color gamut of the first area pixel value p1 based on the first conversion data. According to an embodiment, the first color processor 212 may convert the color gamut of the first area pixel value p1 by using interpolation based on the first look-up table 214. The first color processor 212 may convert the color gamut of the first area pixel value p1 by using interpolation based on the first conversion data corresponding to the first area pixel value p1.

According to an embodiment, the first color processor 212 may convert the color gamut of the first area pixel value p1 based on the first conversion data and lower m (m is a positive number) bits from among k (k is a positive number) bits of the first area pixel value p1. The first color processor 212 may convert the color gamut of the first area pixel value p1 by using interpolation based on the first conversion data corresponding to the first area pixel value p1 and the lower m bits of the first area pixel value p1. The first color processor 212 may convert the color gamut of the first area pixel value p1 and may output color gamut data.

Figure 9B:
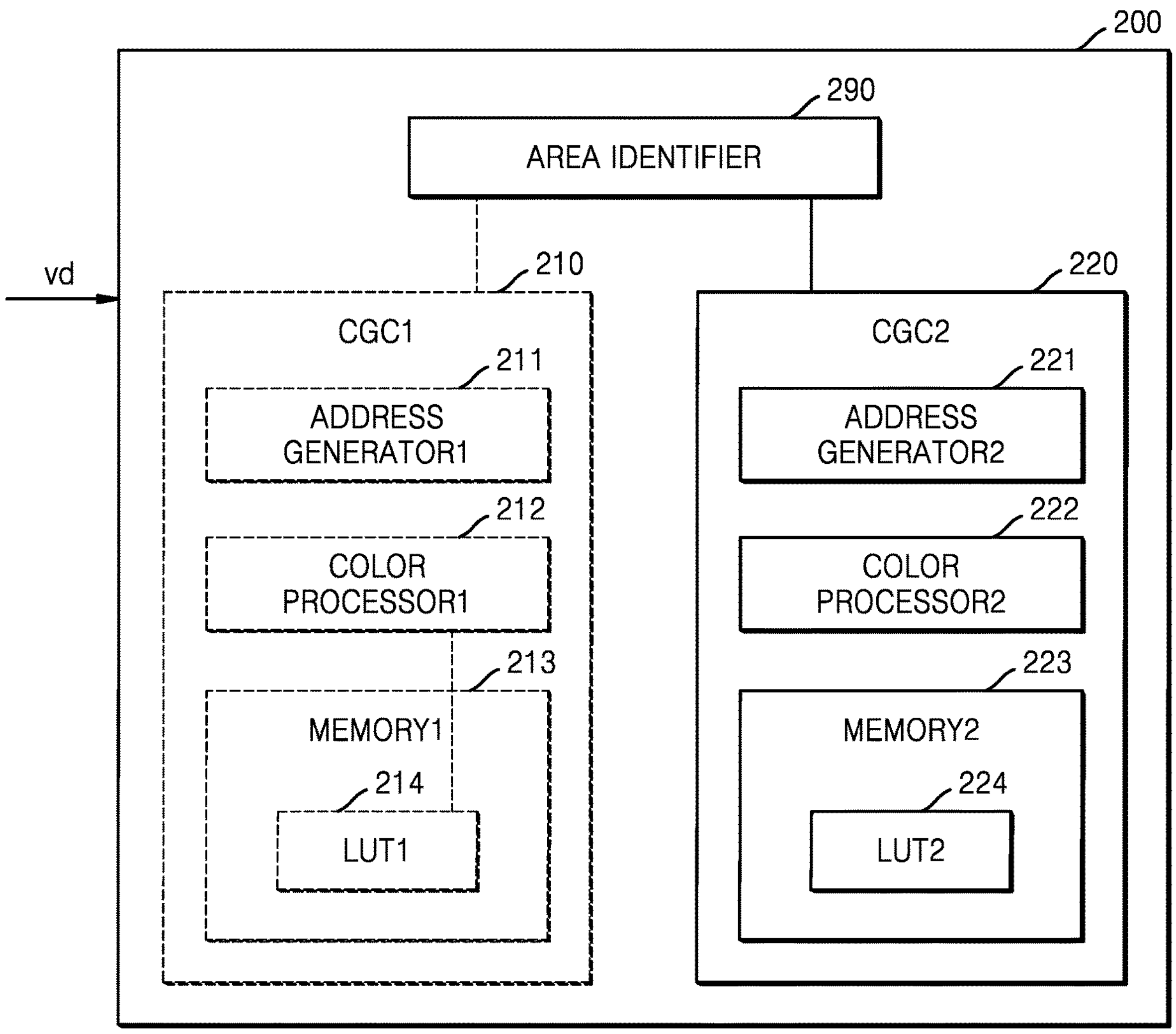
FIG. 9B is a diagram for describing an operation of an electronic device according to an embodiment.

FIG. 9B is a diagram for describing an operation of an electronic device according to an embodiment. In detail, FIG. 9B illustrates a method performed, by the second color gamut compensator 220, of converting a color gamut of a pixel value. It is assumed that the first color gamut compensator 210 is in a normal state, and the second color gamut compensator 220 is in an idle state. The first color gamut compensator 210 may be a main color gamut compensator, and the second color gamut compensator 220 may be an auxiliary color gamut compensator. The same aspects as described above will not be described.

Referring to FIG. 8 together, the area identifier 290 may identify on which area of the display 240 each pixel value is displayed. The area identifier 290 may identify whether each pixel value is displayed on the first area AR1 or the second area AR2. The area identifier 290 may transmit the second area pixel value p2 to the second color gamut compensator 220, when the pixel value is displayed on the second area AR2. Hereinafter, it is assumed that the pixel value is the second area pixel value p2.

The area identifier 290 may transmit the second area pixel value p2 to the second color gamut compensator 220. The area identifier 290 may directly transmit the second area pixel value p2 to the second color gamut compensator 220 or may control another component of the electronic device 200 to transmit the second area pixel value p2 to the second color gamut compensator 220. For example, the area identifier 290 may control the first image processor to transmit the second area pixel value p2 image-processed by the first image processor to the second color gamut compensator 220.

The second color gamut compensator 220 may convert the color gamut of the second area pixel value p2 based on the second look-up table 224. The second color gamut compensator 220 may include a second address generator 221, a second color processor 222, and the second memory 223. The second color gamut compensator 220 may further include other components. The second address generator 221, the second color processor 222, and the second memory 223 may be substantially the same as the first address generator 211, the first color processor 212, and the first memory 213, respectively, and thus, the same descriptions are not repeated.

The second address generator 221 may calculate a location of the second look-up table 224, in which second conversion data corresponding to each piece of color space data included in the second area pixel value p2 is stored. The second address generator 221 may generate an address with respect to the second conversion data corresponding to the second area pixel value p2 based on the second look-up table 224. According to an embodiment, the second address generator 221 may generate the address for storing the second conversion data corresponding to the second area pixel value p2 by using upper n (n is a positive number) bits from among k (k is a positive number) bits of the second area pixel value p2.

The second color processor 222 may obtain the second conversion data corresponding to the second area pixel value p2 from the second look-up table 224 based on the address generated by the second address generator 221. The second color processor 222 may convert the color gamut of the second area pixel value p2 based on the second conversion data. According to an embodiment, the second color processor 222 may convert the color gamut of the second area pixel value p2 by using interpolation based on the second look-up table 224. The second color processor 222 may convert the color gamut of the second area pixel value p2 by using interpolation based on the second conversion data corresponding to the second area pixel value p2.

According to an embodiment, the second color processor 222 may convert the color gamut of the second area pixel value p2 based on the second conversion data and lower m (m is a positive number) bits from among k (k is a positive number) bits of the second area pixel value p2. The second color processor 222 may convert the color gamut of the second area pixel value p2 by using interpolation based on the second conversion data corresponding to the second area pixel value p2 and the lower m bits of the second area pixel value p2. The second color processor 222 may convert the color gamut of the second area pixel value p2 and may output color gamut data.

Figure 10:
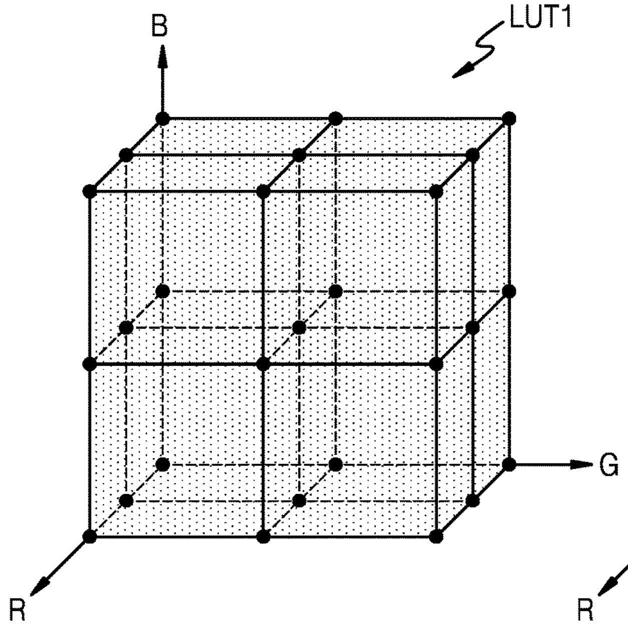
FIG. 10 is a diagram for describing a first look-up table and a second look-up table, according to an embodiment.

FIG. 10 is a diagram for describing a first look-up table LUT1 and a second look-up table LUT2 according to an embodiment. In detail, the first look-up table LUT1 and the second look-up table LUT2 of FIG. 10 may be loaded by the first color gamut compensator 210 and the second color gamut compensator 220 of FIG. 9, respectively. To compare with the second look-up table LUT2 of FIG. 6B, the color space area of the second look-up table LUT2 of FIG. 6B may be different from a color space area of the second look-up table LUT2 of FIG. 10. The same aspects as described above will not be described. FIGS. 8, 9A, and 9B will be referred to all together.

Referring to FIG. 10, a color space area represented by the first look-up table LUT1 may be different from a color space area represented by the second look-up table LUT2. First conversion data included in the first look-up table LUT1 and second conversion data included in the second look-up table LUT2 may be different from each other. In other words, since the color space areas represented by the first and second look-up tables LUT1 and LUT2 are different from each other, the first and second conversion data the first and second look-up tables LUT1 and LUT2 are different from each other. The color gamut of the pixel value may be converted differently by the first look-up table LUT1 and the second look-up table LUT2. For example, the color gamut data of the first pixel value converted by using the first look-up table LUT1 may be different from the color gamut data of the second pixel value converted by using the second look-up table LUT2. Even when the pixel value is the same, the color gamut data may be differently output, when different look-up tables are used.

The first color gamut compensator 210 may convert the color gamut of the first area pixel value p1 based on the first look-up table LUT1. The second color gamut compensator 220 may convert the color gamut of the second area pixel value p2 based on the second look-up table LUT2. Even when the pixel value is the same, the color may be differently output on the display 240 according to an area of the display 240.

Depending on the area of the display 240, one of the first color gamut compensator 210 and the second color gamut compensator 220 may compensate for the color gamut of the pixel value. The color gamut of the display 240 may be differently compensated for by the first color gamut compensator 210 and the second color gamut compensator 220. This is achieved by utilizing the first look-up table 214 and the second look-up table 224, respectively, based on a specific area of the display 240. By using the color gamut compensator in an idle state, the color gamut of the pixel value can still be compensated for based on the area of the display 240, even without using an additional color gamut compensator. This approach enhances the user's visibility.

Figure 11:
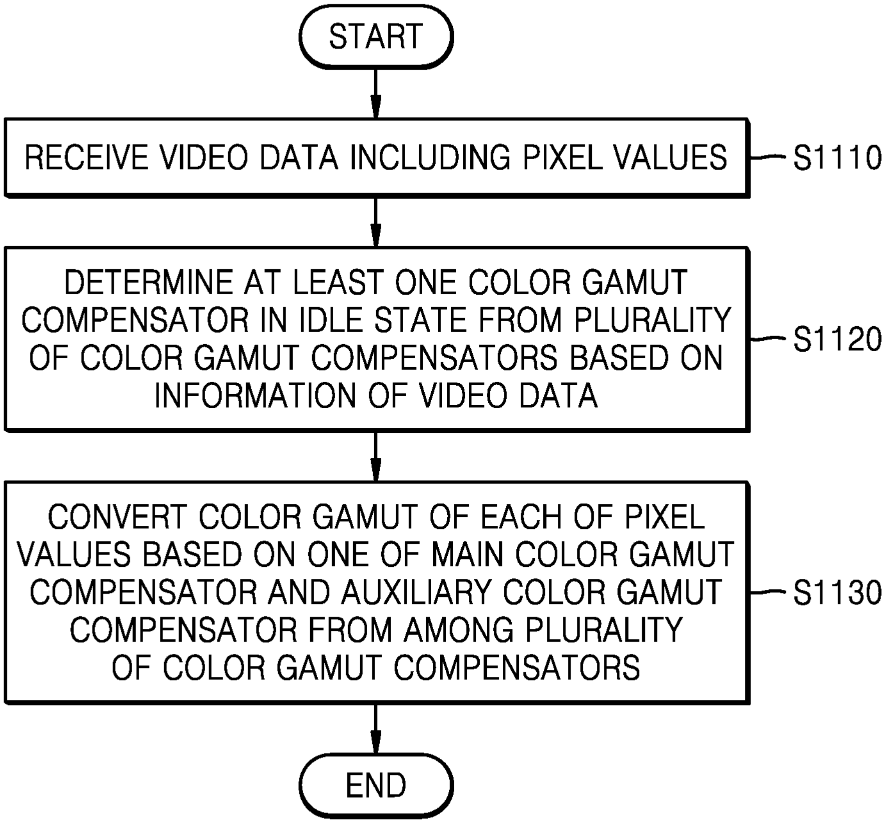
FIG. 11 is a flowchart of an operating method of an electronic device, according to an embodiment.

FIG. 11 is a flowchart of an operating method of an electronic device, according to an embodiment. The same aspects as described above will not be described.

In operation S1110, the electronic device may receive video data including pixel values. The video data may be a series of video frames. The video data may include pixel values forming the video frames. According to an embodiment, each of the pixel values may include three pieces of color space data. Each pixel value may include first color space data, second color space data, and third color space data. Each of the first color space data, the second color space data, and the third color space data may indicate color information.

The electronic device may include a plurality of image processors and a plurality of color gamut compensators to perform an image processing operation and a color gamut conversion operation on the video data. The plurality of image processors may correspond to the plurality of color gamut compensators, respectively. For example, a first image processor may correspond to a first color gamut compensator, and a second image processor may correspond to a second color gamut compensator.

In operation S1120, the electronic device may determine at least one color gamut compensator in an idle state from among the plurality of color gamut compensators, based on information of the video data. The information of the video data may denote a resolution, a frame rate, etc. of the video data.

The color gamut compensator in the idle state may denote a color gamut compensator corresponding to an image processor that does not perform image processing on the video data from among the plurality of image processors. For example, the image processor that does not perform image processing on the video data may be the second image processor in an idle state. The color gamut compensator in the idle state may be the second color gamut compensator corresponding to the second image processor.

The electronic device may select at least one auxiliary color gamut compensator in an idle state from among the plurality of color gamut compensators, based on the information of the video data. The auxiliary color gamut compensator may be at least one of the color gamut compensators in the idle state and may convert a color gamut of at least one of the pixel values image-processed by the image processor or may assist the main color gamut compensator in converting the color gamut of the pixel values. The main color gamut compensator may denote a color gamut compensator corresponding to the image processor that performs image processing on the video data. For example, when the second color gamut compensator and a third color gamut compensator are in the idle state, the electronic device may select the second color gamut compensator as the auxiliary color gamut compensator.

The main color gamut compensator may load a first look-up table. The auxiliary color gamut compensator may load a second look-up table. The first look-up table may store first conversion data for converting the color gamut of the video data. The second look-up table may store second conversion data. The first look-up table and the second look-up table may be different from each other.

In operation S1130, the electronic device may convert the color gamut of each of the pixel values by using one of the main color gamut compensator and the auxiliary color gamut compensator from among the plurality of color gamut compensators.

According to an embodiment, the main color gamut compensator may convert the color gamut of each pixel value. The main color gamut compensator may convert the color gamut of each pixel value based on at least one of the first look-up table and the second look-up table. For example, the main color gamut compensator may convert a color gamut of a first pixel value based on the first look-up table. The main color gamut compensator may obtain the first conversion data corresponding to the first pixel value from the first look-up table and may convert the color gamut of the first pixel value based on the first conversion data and the first pixel value. As another example, the main color gamut compensator may convert a color gamut of a second pixel value based on the second look-up table loaded by the auxiliary color gamut compensator. The main color gamut compensator may obtain second conversion data corresponding to the second pixel value from the second look-up table and may convert the color gamut of the second pixel value based on the second conversion data and the second pixel value. Additionally, the main color gamut compensator may convert a color gamut of a third pixel value based on the first look-up table and the second look-up table.

According to an embodiment, the electronic device may convert the color gamut of each pixel value based on an area of the display, on which each pixel value is displayed. The electronic device may identify the area of the display, on which each pixel value is displayed. The electronic device may identify on which area of the display each pixel value is displayed, based on location information of each pixel value. For example, the electronic device may identify whether each pixel value is displayed on a first area or a second area of the display.

The electronic device may transmit, based on the area, each pixel value to one of the main color gamut compensator and the auxiliary color gamut compensator. For example, the electronic device may transmit a first area pixel value displayed on the first area of the display to the main color gamut compensator. The electronic device may transmit a second area pixel value displayed on the second area of the display to the auxiliary color gamut compensator.

The main color gamut compensator may convert the color gamut of the first area pixel value based on the first look-up table and may generate color gamut data. The auxiliary color gamut compensator may convert the color gamut of the second area pixel value based on the second look-up table and may generate color gamut data.

While the inventive concept has been particularly shown and described with reference to example embodiments thereof, it will be understood that various changes in form and details may be made therein without departing from the spirit and scope of the inventive concept as set forth in the following claims.

What is claimed is:

1. An electronic device comprising:

a first color gamut compensator configured to load a first look-up table storing first conversion data, wherein the first conversion data is used to convert a color gamut of video data including pixel values; and a second color gamut compensator configured to load a second look-up table storing second conversion data, wherein the second conversion data is used to convert the color gamut of the video data when the second color gamut compensator is in an idle state, wherein any one of the first color gamut compensator and the second color gamut compensator is further configured to convert a color gamut of each of the pixel values, by using the first look-up table or the second look-up table, and wherein the first color gamut compensator is further configured to:

generate an address indicating a location where conversion data corresponding to each of the pixel values is stored;

obtain, based on the address, the conversion data corresponding to each of the pixel values, from the first look-up table or the second look-up table;

convert the color gamut of each of the pixel values, based on its respective conversion data; and output color gamut data that is obtained by converting the color gamut of each of the pixel values.

2. The electronic device of claim 1, wherein an area of a color space including color space data corresponding to the second conversion data is less than an area of a color space including color space data corresponding to the first conversion data.

3. The electronic device of claim 1, wherein the first color gamut compensator is further configured to convert the color gamut of each of the pixel values by using the first look-up table or the second look-up table, when the second color gamut compensator is in the idle state.

4. The electronic device of claim 1, wherein the first color gamut compensator is further configured to convert the color gamut of each of the pixel values by using interpolation, based on the first or second conversion data, and output color gamut data that is obtained by converting the color gamut of each of the pixel values.

5. The electronic device of claim 1, wherein the first color gamut compensator is further configured to obtain the first conversion data or the second conversion data by using upper n (n is a positive number) bits from among k (k is a positive number) bits of each of the pixel values.

6. The electronic device of claim 1, wherein the first color gamut compensator is further configured to convert the color gamut of each of the pixel values, based on the first conversion data or the second conversion data, and lower m (m is a positive number) bits from among k (k is a positive number) bits of each of the pixel values and generate color gamut data by converting the color gamut of each of the pixel values.

7. The electronic device of claim 1, further comprising an area identifier configured to identify an area where each of the pixel values is displayed on the display, wherein the area identifier is further configured to transmit, based on the area, each of the pixel values to the first color gamut compensator or the second color gamut compensator.

8. The electronic device of claim 7, wherein the area identifier is further configured to transmit, to the first color gamut compensator, a first area pixel value displayed on a first area of the display from among the pixel values and transmit, to the second color gamut compensator, a second area pixel value displayed on a second area of the display from among the pixel values.

9. The electronic device of claim 8, wherein the first color gamut compensator is further configured to convert a color gamut of the first area pixel value using the first look-up table, and the second color gamut compensator is further configured to convert a color gamut of the second area pixel value using the second look-up table.

10. The electronic device of claim 8, wherein the first color gamut compensator is further configured to obtain the first conversion data by using upper n (n is a positive number) bits from among k (k is a positive number) bits of the first area pixel value and generate color gamut data by converting the color gamut of the first area pixel value, by using the first conversion data and lower m (m is a positive number) bits from among the k bits of the first area pixel value, and the second color gamut compensator is further configured to obtain the second conversion data by using upper n (n is a positive number) bits from among k (k is a positive number) bits of the second area pixel value and generate color gamut data by converting the color gamut of the second area pixel value, by using the second conversion data and lower m (m is a positive number) bits from among the k bits of the second area pixel value.

11. The electronic device of claim 1, wherein each of the pixel values includes first color space data, second color space data, and third color space data, and each of the first color space data, the second color space data, and the third color space data includes color information.

12. The electronic device of claim 1, further comprising:

a first image processor corresponding to the first color gamut compensator and configured to perform image processing on the video data; and a second image processor corresponding to the second color gamut compensator and configured to perform image processing on the video data, wherein the idle state is a state in which the second image processor does not perform image processing on the video data.

13. An electronic device comprising:

a plurality of image processors configured to perform image processing on video data including pixel values;

a plurality of color gamut compensators corresponding to the plurality of image processors, respectively, and configured to convert a color gamut of each of the pixel values included in the video data that has been image-processed; and a controller configured to select, based on information of the video data, one or more auxiliary color gamut compensators in an idle state from among the plurality of color gamut compensators, wherein a main color gamut compensator that is not in the idle state from among the plurality of color gamut compensators and at least one of the one or more auxiliary color gamut compensators are configured to convert a color gamut of each of compensated pixel values, wherein the compensated pixel values are pixel values included in the video data that were image-processed by an image processor corresponding to the main color gamut compensator.

14. The electronic device of claim 13, wherein the main color gamut compensator is further configured to load a look-up table storing conversion data that is used to convert the color gamut of each of the compensated pixel values, and the one or more auxiliary color gamut compensators are configured to load a look-up table different from the look-up table loaded by the main color gamut compensator.

15. The electronic device of claim 14, wherein the main color gamut compensator is further configured to convert the color gamut of each of the compensated pixel values by using the look-up table loaded by the main color gamut compensator or the look-up table loaded by the one or more auxiliary color gamut compensators.

16. The electronic device of claim 13, further comprising an area identifier configured to identify an area where each of the compensated pixel values is displayed on a display, wherein the area identifier is further configured to transmit, based on the area, each of the compensated pixel values to the main color gamut compensator or the one or more auxiliary color gamut compensators.

17. The electronic device of claim 16, wherein the main color gamut compensator is further configured to convert the color gamut of the compensated pixel value transmitted to the main color gamut compensator, by using the look-up table loaded by the main color gamut compensator, and the one or more auxiliary color gamut compensators are further configured to convert the color gamut of the compensated pixel value transmitted to the one or more auxiliary color gamut compensators, by using the look-up table loaded by the one or more auxiliary color gamut compensators.

18. The electronic device of claim 13, wherein the color gamut compensator in the idle state is a color gamut compensator corresponding to an image processor that does not perform image processing on the video data from among the plurality of image processors.

19. An operating method of an electronic device including a plurality of color gamut compensators for converting a color gamut of each of pixel values, the operating method comprising:

receiving video data including the pixel values;

determining one or more color gamut compensators in an idle state from among the plurality of color gamut compensators, based on information of the video data; and converting the color gamut of each of the pixel values, by using one of a main color gamut compensator which is not in the idle state and one of one or more auxiliary color gamut compensators from among the plurality of color gamut compensators.

* * * * *